United States Patent
Liu et al.

(10) Patent No.: US 12,427,733 B2
(45) Date of Patent: Sep. 30, 2025

(54) MOLDING METHOD OF SUPPORT ROD

(71) Applicant: HOCHENG CORPORATION, Taipei (TW)

(72) Inventors: Che-Yuan Liu, Taipei (TW); Chang-Hsing Lee, Taipei (TW); Ming-Chuan Liu, Taipei (TW); Zhao-Xu Lai, Taipei (TW); Pen-Chien Yu, Taipei (TW); Shu-Fen Wang, Taipei (TW); Chia-Chang Hsu, Taipei (TW); Ren-Wei Tsai, Taipei (TW); Zong-You Chen, Taipei (TW); Da-Chun Chien, Taipei (TW)

(73) Assignee: HOCHENG CORPORATION, Taipei (TW)

( * ) Notice: Subject to any disclaimer, the term of this patent is extended or adjusted under 35 U.S.C. 154(b) by 310 days.

(21) Appl. No.: 18/318,961

(22) Filed: May 17, 2023

(65) Prior Publication Data
US 2024/0239059 A1     Jul. 18, 2024

(30) Foreign Application Priority Data

Jan. 12, 2023  (TW) .................................. 112101364
Jan. 12, 2023  (TW) .................................. 112101365

(51) Int. Cl.
| B29C 70/52 | (2006.01) |
| B29C 70/54 | (2006.01) |
| B29K 307/04 | (2006.01) |

(52) U.S. Cl.
CPC .......... *B29C 70/521* (2013.01); *B29C 70/545* (2013.01); *B29K 2307/04* (2013.01)

(58) Field of Classification Search
CPC ...... B29C 70/78; B29C 70/526; B29C 70/521
See application file for complete search history.

(56) References Cited

U.S. PATENT DOCUMENTS

| 3,560,170 | A | * | 2/1971 | Durrwachter | ........ | H01H 1/0231 |
| | | | | | | 428/656 |
| 4,012,267 | A | * | 3/1977 | Klein | ........................ | B32B 5/02 |
| | | | | | | 156/275.5 |
| 6,607,798 | B1 | * | 8/2003 | Watanabe | ................. | B32B 5/28 |
| | | | | | | 428/36.5 |

\* cited by examiner

*Primary Examiner* — Matthew J Daniels
(74) *Attorney, Agent, or Firm* — MUNCY, GEISSLER, OLDS & LOWE, P.C.

(57) ABSTRACT

A molding method of a support rod that first passing a plurality of long fibers through a resin bath for impregnating with resin, then passing the plurality of long fibers impregnated with resin through a bundling hole of a position-constrained vertical plate on a machine to preliminarily form a bundle end; providing a coating layer on the machine, one end of the coating layer obliquely passes through a guiding portion on the position-constrained vertical plate to downwardly contact the bundle end; then placing the one end of the coating layer and the bundle end into a mold cavity of a mold at the same time to form a long rod body; and then cutting the long rod body into multi-segment support rods through a cutting process.

6 Claims, 5 Drawing Sheets

MOLDING METHOD OF SUPPORT ROD

FIELD OF THE INVENTION

The present invention is related to a molding method of a support rod, especially one that antistatic and insulating material can be combined densely and smoothly with a surface of a bundle end.

BACKGROUND OF THE INVENTION

For the solid strip fiber rod, in order to produce a precise shape and facilitate processing to save costs, it is mainly pultruded by pultrusion method. The pultrusion method is to impregnate a plurality of long fibers in the resin bath, then place it in the mold, heat and harden, and then pull it out.

For some types of wafer cassette, the support rods used to carry the wafers are mainly pultruded by a plurality of carbon fibers containing resin. Therefore, the support rods are mainly composed of carbon fibers and resins. However, carbon fiber is a conductor, conduction may occur; while resin is an insulator, static electricity may easily be formed. Therefore, in actual use, the outer periphery of the support rods will be covered with a layer of insulating and antistatic materials (ESD, Electrostatic Discharge) to prevent the generation of conduction and static electricity. The coating method of insulating and antistatic materials is generally to first apply a layer of insulating and ESD materials in at least one cavity of a mold, and then put at least one support rod upside down respectively, and heat and pressurize, and then the insulating and antistatic materials are coated and molded on the outer periphery of at least one support rod. However, the production speed of this kind of coating and molding method is too slow, and the outer surface formed is too rough, which is easy to produce fine air bubbles and affect the quality of the product.

SUMMARY OF THE INVENTION

Accordingly, in order to provide a molding method different from the conventional technology and improve the above drawbacks, the applicant has accumulated many years of experience and continuous research and development. Therefore, the present invention has been invented.

One object of the present invention is to provide a molding method of a support rod, so as to solve the problem that (1) the conventional technology adopts coating and molding to manufacture support rod respectively, and its speed is too slow, (2) the surface of the formed insulating and antistatic materials layer is rough, and (3) it is often to produce fine air bubbles and affect the quality of the product. By the molding method, after a coating layer is directly bonded to a bundle end of a plurality of long fibers impregnated with resin, it is placed in a cavity of a mold to form a long rod body, so as to prevent the generation of conduction and static electricity and make the coating layer to be tightly bonded to the surface of the bundle end to improve product quality. In the meantime, the production efficiency can be improved.

In order to solve the above described problems and to achieve the expected effect, the present invention provides a molding method of a support rod comprising following steps of: A. passing a plurality of long fibers through a resin bath for impregnating with resin, then passing the plurality of long fibers impregnated with resin through a bundling hole of a position-constrained vertical plate on a machine to preliminarily form a bundle end; B. providing a coating layer on the machine, one end of the coating layer obliquely passes through a guiding portion on the position-constrained vertical plate to downwardly contact the bundle end; and C. placing the one end of the coating layer and the bundle end into a mold cavity of a mold at the same time to form a long rod body; and then cutting the long rod body into multi-segment support rods through a cutting process.

In implementation, a top of the long rod body has at least one inclined surface, a first lateral surface and a second lateral surface are extending downwardly from two opposite sides of the at least one inclined surface respectively.

In implementation, the coating layer comprises at least one antistatic layer and an isolating layer stacked one above another.

In implementation, a resistance of the at least one antistatic layer is between $10^4\Omega$ and $10^{10}\Omega$.

In implementation, the guiding portion is a transverse through hole on the position-constrained vertical plate.

In implementation, the guiding portion is a transverse recess on the position-constrained vertical plate.

In implementation, after the one end of the coating layer and the bundle end are placed into the mold cavity of the mold at the same time, the molding method further comprises a drying and curing process to form the long rod body.

In implementation, the present invention may provide a stand on the machine, the stand is disposed between the position-constrained vertical plate and the resin bath, and a reel is sleeved on the stand for winding the coating layer.

In implementation, the present invention further comprises a step of: adding an antistatic material in the resin bath, and providing a stand on the machine, a reel is sleeved on the stand, an isolating cloth is wound on the reel, the coating layer impregnated with resin and the antistatic material is formed after the isolating cloth passed through the resin bath.

In implementation, an upper roll and a lower roll are arranged up and down in parallel manner in the resin bath respectively, the plurality of long fibers passes under the lower roll, the isolating cloth passed between the upper roll and the lower roll for separately guiding the plurality of long fibers and the isolating cloth.

The molding method of the support rod of the present invention may also comprise following steps of: A. passing a plurality of long fibers through a resin bath for impregnating with resin, then passing the plurality of long fibers impregnated with resin through a plurality of bundling holes of a position-constrained vertical plate on a machine to preliminarily form a plurality of bundle ends respectively; B. providing a plurality of coating layers on the machine, one end of the plurality of coating layers obliquely passes through a plurality of guiding portions on the position-constrained vertical plate to downwardly contact the plurality of bundle ends respectively; and C. placing the one end of the plurality of coating layers and the plurality of bundle ends into a plurality of mold cavities of a mold at the same time to form a plurality of long rod bodies respectively; and then cutting each of the plurality of long rod bodies into multi-segment support rods through a cutting process.

For further understanding the characteristics and effects of the present invention, some preferred embodiments referred to drawings are in detail described as follows.

DETAILED DESCRIPTIONS OF PREFERRED EMBODIMENTS

Figure 1:
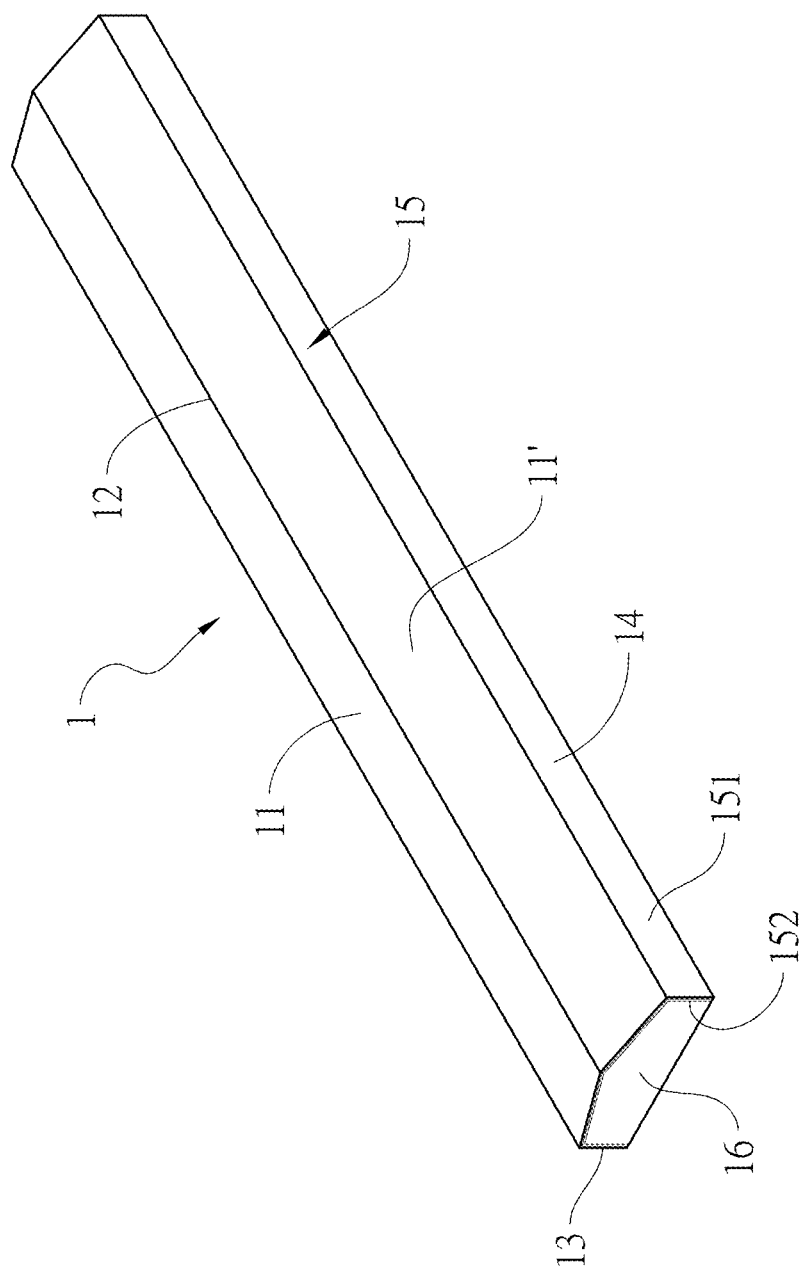
FIG. 1 is a schematic perspective view of a support rod of the present invention.

FIG. 1 is a preferred embodiment of a support rod of the present invention. A support rod 1 is cut from a long rod body with a pentagonal cross-section. A top of the support rod 1 has two inclined surfaces (11, 11'). The two inclined surfaces (11, 11') have a common top edge 12. A first lateral surface 13 and a second lateral surface 14 are extending downwardly from two opposite sides of the two inclined surfaces (11, 11'). In implementation, the top of the support rod 1 may have only on inclined surface. The support rod 1 comprises a coating layer 15 and a bundling material 16. The coating layer 15 is covered on an outer surface of the bundling material 16. The bundling material 16 is formed by bundling a plurality of long carbon fibers impregnated with resin. In implementation, the coating layer 15 comprises an antistatic layer 151 and an isolating layer 152 stacked one above another. The antistatic layer 151 is a carbon nanotube layer, or may be a graphene layer or a carbon power layer, so that a resistance of the antistatic layer 151 may be between $10^4\Omega$ and $10^{10}\Omega$. The isolating layer 152 is a fiberglass layer, or may be a layer of insulating material such as polyvinyl chloride (PVC) or polyethylene terephthalate (PET), so as to prevent a surface of the support rod 1 from conducting and static electricity.

Figure 2:
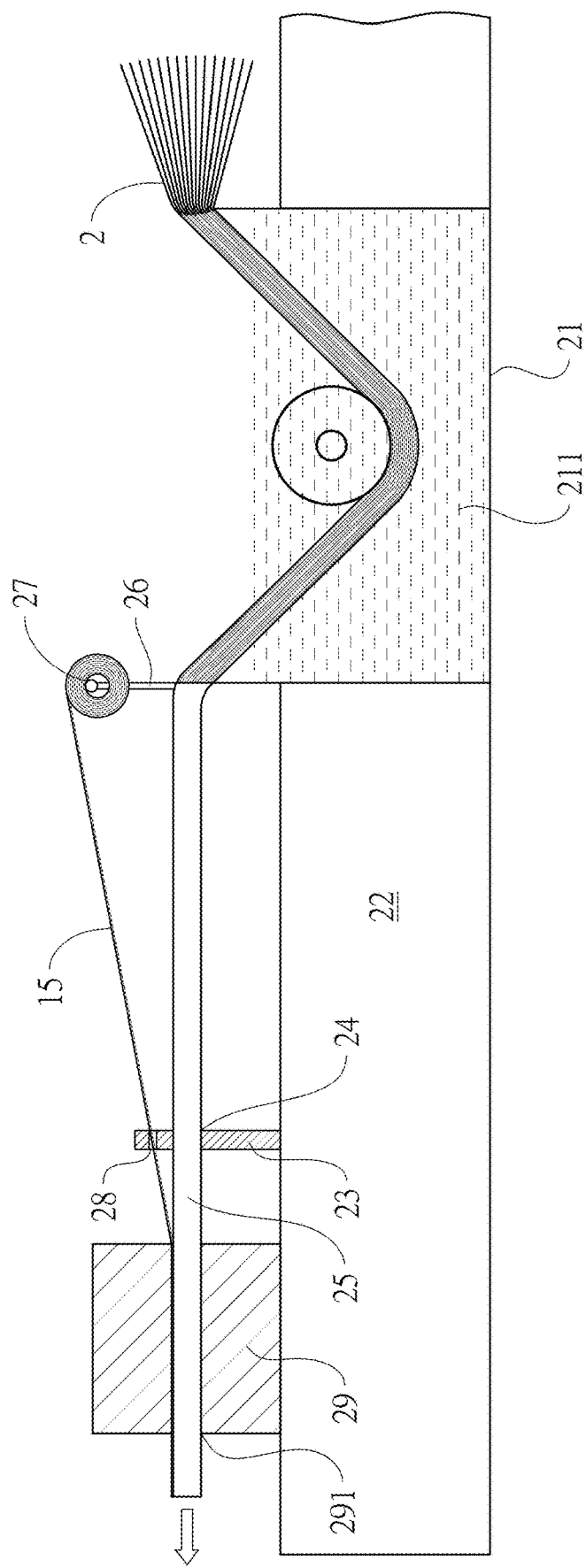
FIG. 2 is a schematic diagram of molding process of a first embodiment of a molding method of a support rod of the present invention.
Figure 3:
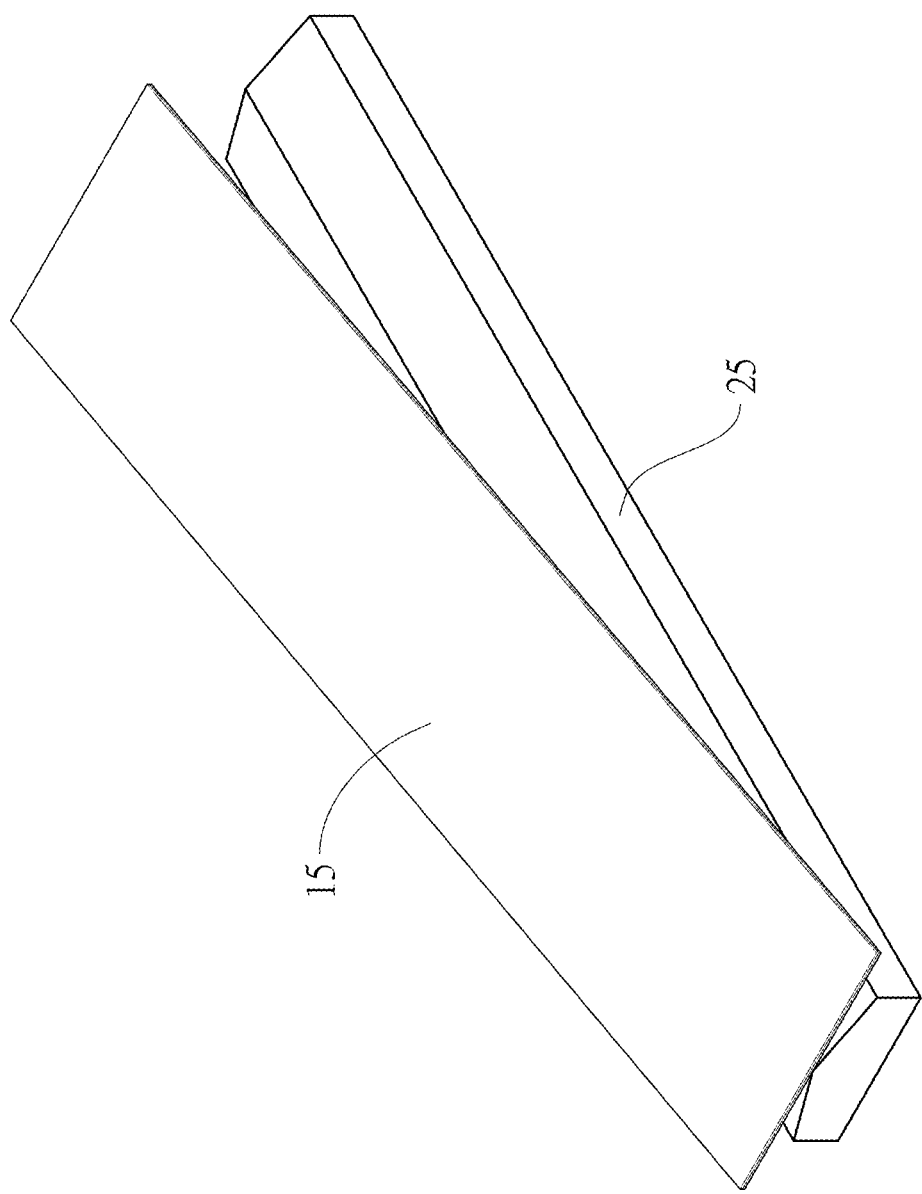
FIG. 3 is a schematic perspective view when one end of a coating layer downwardly contacts a bundle end of the present invention.

Please refer to FIGS. 2 and 3, which show a first embodiment of a molding method of a support rod 1 of the present invention. The molding method main comprises following steps of:

A. passing a plurality of long carbon fibers 2 through a resin bath 21 for impregnating with resin 211, then passing the plurality of long fibers 2 impregnated with resin 211 through a bundling hole 24 of a position-constrained vertical plate 23 on a machine 22 to preliminarily form a bundle end 25;

B. providing a stand 26 on one side of the machine 22, the stand 26 is disposed between the position-constrained vertical plate 23 and the resin bath 21; a reel 27 is sleeved on the stand 26 for winding a coating layer 15, one end of the coating layer 15 obliquely passes through a guiding portion 28 on the position-constrained vertical plate 23 to downwardly contact the bundle end 25; and C. placing the one end of the coating layer 15 and the bundle end 25 into a mold cavity 291 of a mold 29 at the same time to form a long rod body; and then cutting the long rod body into multi-segment support rods 1 through a cutting process.

Figure 4:
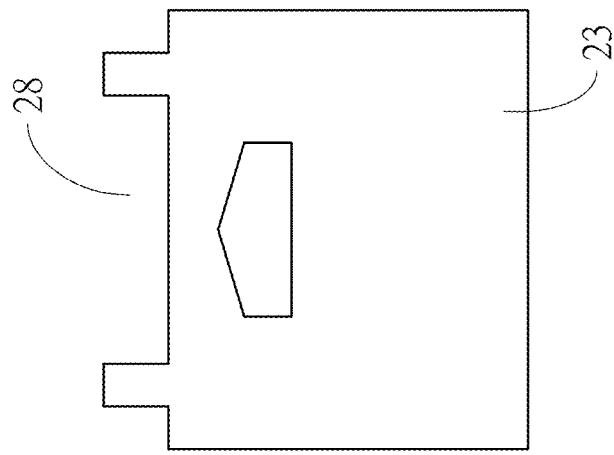
FIG. 4 is a front view of a position-constrained vertical plate of the present invention.

As shown in FIG. 4, the guiding portion 28 is a transverse through hole on the position-constrained vertical plate 23.

Figure 5:
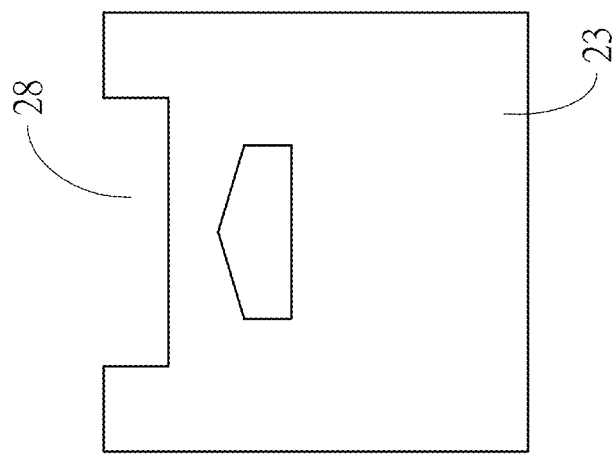
FIG. 5 is a front view of another embodiment of a position-constrained vertical plate of the present invention.
Figure 6:
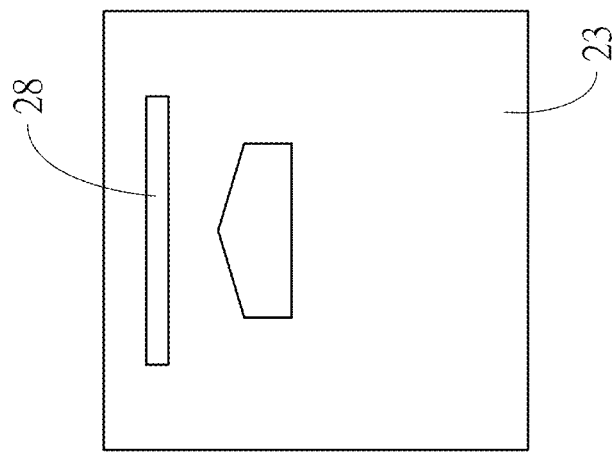
FIG. 6 is a front view of another embodiment of a position-constrained vertical plate of the present invention.

As shown in FIGS. 5 and 6, the guiding portion 28 may be transverse recess on the position-constrained vertical plate 23 to constrain the direction of the movement of the coating layer 15, so that the coating layer 15 can be aligned precisely and downwardly contact the bundle end 25. After the coating layer 15 and the bundle end 25 are placed into the mold cavity 291 of the mold 29 at the same time, the guiding portion 28 can still effectively guide the forward direction of the coating layer 15, so that the coating layer 15 can be stably and uniformly coated on an outer surface of the bundling material 16.

Moreover, in the Step C, after one end of the coating layer 15 and the bundle end 25 are placed into the mold cavity 291 of the mold 29 at the same time, the molding method further comprises a drying and curing process to form the long rod body. The heating temperature of the mold 29 is between 120 and 150, so as to accelerate the reaction, so that the resin in the bundle end 25 can be cured quickly and be bonded to the coating layer 15 to form a long rod body.

In implementation, the molding method of the support rod of the present invention may also comprise following steps of: A. passing a plurality of long fibers 2 through a resin bath 21 for impregnating with resin 211, then passing the plurality of long fibers 2 impregnated with resin 211 through a plurality of bundling holes 24 of a position-constrained vertical plate 23 on a machine 22 to preliminarily form a plurality of bundle ends 25 respectively; B. providing a plurality of coating layers 15 on the machine 22, one end of the plurality of coating layers 15 obliquely passes through a plurality of guiding portions 28 on the position-constrained vertical plate 23 to downwardly contact the plurality of bundle ends 25 respectively; and C. placing the one end of the plurality of coating layers 15 and the plurality of bundle ends 25 into a plurality of mold cavities 291 of a mold 29 at the same time to form a plurality of long rod bodies respectively; and then cutting each of the plurality of long rod bodies into multi-segment support rods 1 through a cutting process.

Figure 7:
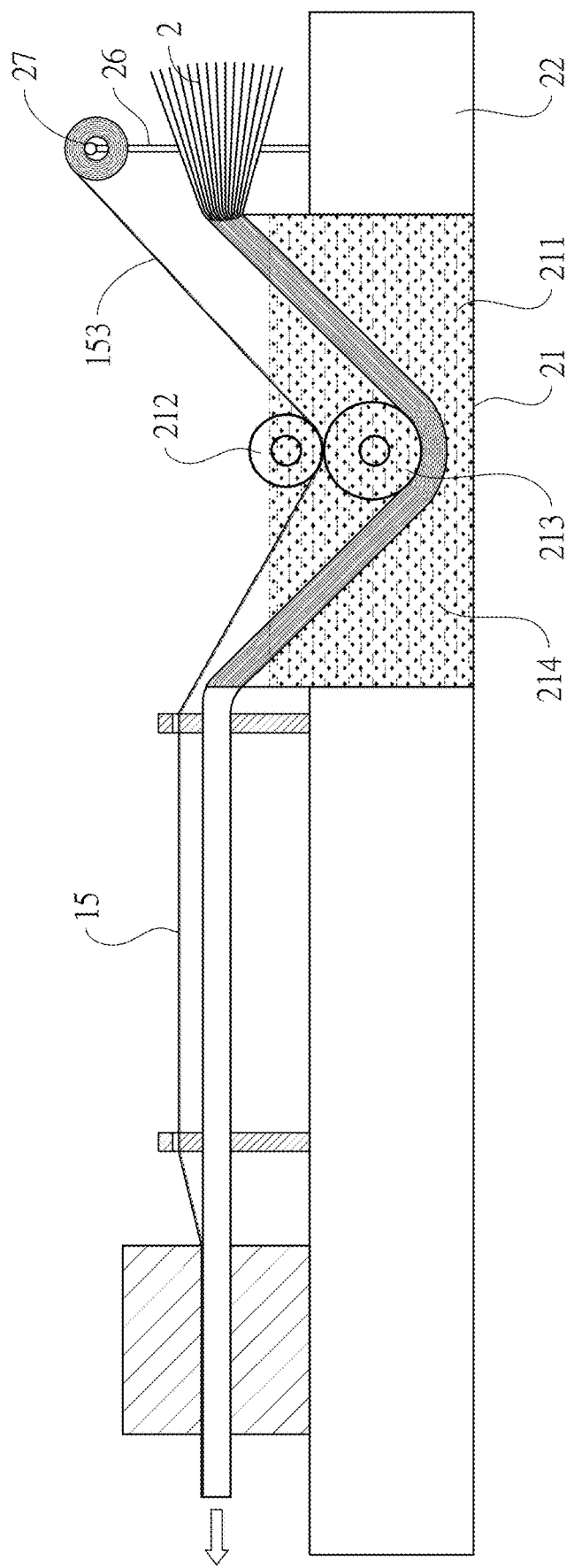
FIG. 7 is a schematic diagram of molding process of a second embodiment of a molding method of a support rod of the present invention.

Please refer to FIG. 7, which show a second embodiment of a molding method of a support rod 1 of the present invention. It differs from the first embodiment in that: the stand 26 is provided on the other side of the machine 22; a reel 27 is sleeved on the stand 26, an isolating cloth 153 is wound on the reel 27. In implementation, the isolating cloth 153 is a fiberglass cloth, or may be a long strip cloth with insulating effect, such as polyvinyl chloride (PVC) or polyethylene terephthalate (PET). An upper roll 212 and a lower roll 213 are arranged up and down in parallel manner in the resin bath 21 respectively. An antistatic material 214 is added in the resin bath 21. In implementation, the antistatic material 214 is carbon nanotubes, graphene or carbon powers.

In this way, when the plurality of long fibers 2 can pass under the lower roll 213 and upwardly abut against a bottom surface of the lower roll 213, and isolating cloth 153 can pass between the upper roll 212 and the lower roll 213 and upwardly abut against a bottom surface of the upper roll 212, the plurality of long fibers 2 and the isolating cloth 153 can be separately guided for passing through the resin bath 21, and so that the resin 211 and the antistatic material 214 can be combined with an upper surface and a lower surface of the isolating cloth 153 to form two antistatic layers 151. A resistance of the antistatic layer 151 is between $10^4\Omega$ and $10^{10}\Omega$; the coating layer 15 impregnated with resin and the antistatic material is formed after the isolating cloth 153 passed through the resin bath 21.

As disclosed in the above description and attached drawings, the present invention can provide a molding method of a support rod. After a coating layer is directly bonded to a bundle end of a plurality of long fibers impregnated with resin, then it is placed in a cavity of a mold to form a long rod body, so as to prevent the generation of conduction and static electricity and make the coating layer to be tightly bonded to the surface of the bundle end to improve product quality. In the meantime, the long rod body can be cut into multi-segment support rods, so as to improve production efficiency. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A molding method of a support rod, comprising following steps of:
    adding an antistatic material in a resin bath;
    providing a stand on a machine, wherein a reel is sleeved on said stand;
    providing an isolating cloth wound on said reel;
    passing a plurality of long fibers through said resin bath for impregnating with resin and said antistatic material, then passing said plurality of long fibers impregnated with resin and said antistatic material through a bundling hole of a position-constrained vertical plate on said machine to preliminarily form a bundle end;
    passing said isolating cloth through said resin bath to form a coating layer impregnated with resin and said antistatic material, then passing one end of said coating layer obliquely through a guiding portion on said position-constrained vertical plate to downwardly contact said bundle end; and
    placing said one end of said coating layer and said bundle end into a mold cavity of a mold at the same time to form a long rod body; and then cutting said long rod body into multi-segment support rods through a cutting process.

2. The molding method of the support rod according to claim 1, wherein a top of said long rod body has at least one inclined surface, a first lateral surface and a second lateral surface are extending downwardly from two opposite sides of said at least one inclined surface respectively.

3. The molding method of the support rod according to claim 1, wherein said guiding portion is a transverse through hole on said position-constrained vertical plate.

4. The molding method of the support rod according to claim 1, wherein said guiding portion is a transverse recess on said position-constrained vertical plate.

5. The molding method of the support rod according to claim 1, wherein after said one end of said coating layer and said bundle end are placed into said mold cavity of said mold at the same time, said molding method further comprises a drying and curing process to form said long rod body.

6. The molding method of the support rod according to claim 1, wherein an upper roll and a lower roll are arranged up and down in parallel manner in said resin bath respectively, said plurality of long fibers passes under said lower roll, said isolating cloth passed between said upper roll and said lower roll for separately guiding said plurality of long fibers and said isolating cloth.

* * * * *